(12) United States Patent
Kohio et al.

(10) Patent No.: US 9,854,753 B2
(45) Date of Patent: Jan. 2, 2018

(54) STRIPPING BLADE FOR A FORESTRY MACHINE

(71) Applicant: Ponsse Oyj, Vierema (FI)

(72) Inventors: Toni Kohio, Iisalmi (FI); Tero Kaatrasalo, Iisalmi (FI)

(73) Assignee: Ponsse Oyj, Vierema (FI)

( * ) Notice: Subject to any disclaimer, the term of this patent is extended or adjusted under 35 U.S.C. 154(b) by 467 days.

(21) Appl. No.: 14/411,167

(22) PCT Filed: Jun. 20, 2013

(86) PCT No.: PCT/FI2013/050686
§ 371 (c)(1),
(2) Date: Dec. 24, 2014

(87) PCT Pub. No.: WO2014/001629
PCT Pub. Date: Jan. 3, 2014

(65) Prior Publication Data
US 2015/0195999 A1   Jul. 16, 2015

(30) Foreign Application Priority Data

Jun. 28, 2012   (FI) ...................................... 20125737

(51) Int. Cl.
*A01G 23/095*   (2006.01)

(52) U.S. Cl.
CPC .................................. *A01G 23/095* (2013.01)

(58) Field of Classification Search
CPC .... A01G 23/097; A01G 23/08; A01G 23/081; A01G 23/083; A01G 23/095; B27L 1/00; B26B 21/56; B26B 9/02
See application file for complete search history.

(56) References Cited

U.S. PATENT DOCUMENTS 8,002,004 B2   8/2011   Smythe

OTHER PUBLICATIONS

International Search Report, dated Oct. 16, 2013, issued in International Application No. PCT/FI2013/050686 (3 pages).

*Primary Examiner* — Matthew G Katcoff
(74) *Attorney, Agent, or Firm* — Beem Patent Law Firm

(57) ABSTRACT

The invention relates to a stripping blade for a forestry machine, which includes an attachment part for pivoting the stripping blade to the forestry machine, and an at least partly curved blade part attached to the said attachment part for stripping the branches of a tree, which blade part includes a blade surface that at least partly conforms to the trunk of the tree and a support structure conforming to the blade surface connecting to the outer surface of the blade surface relative to the tree, which said stripping blade is manufactured mainly by casting. The support structure is hollow.

18 Claims, 12 Drawing Sheets

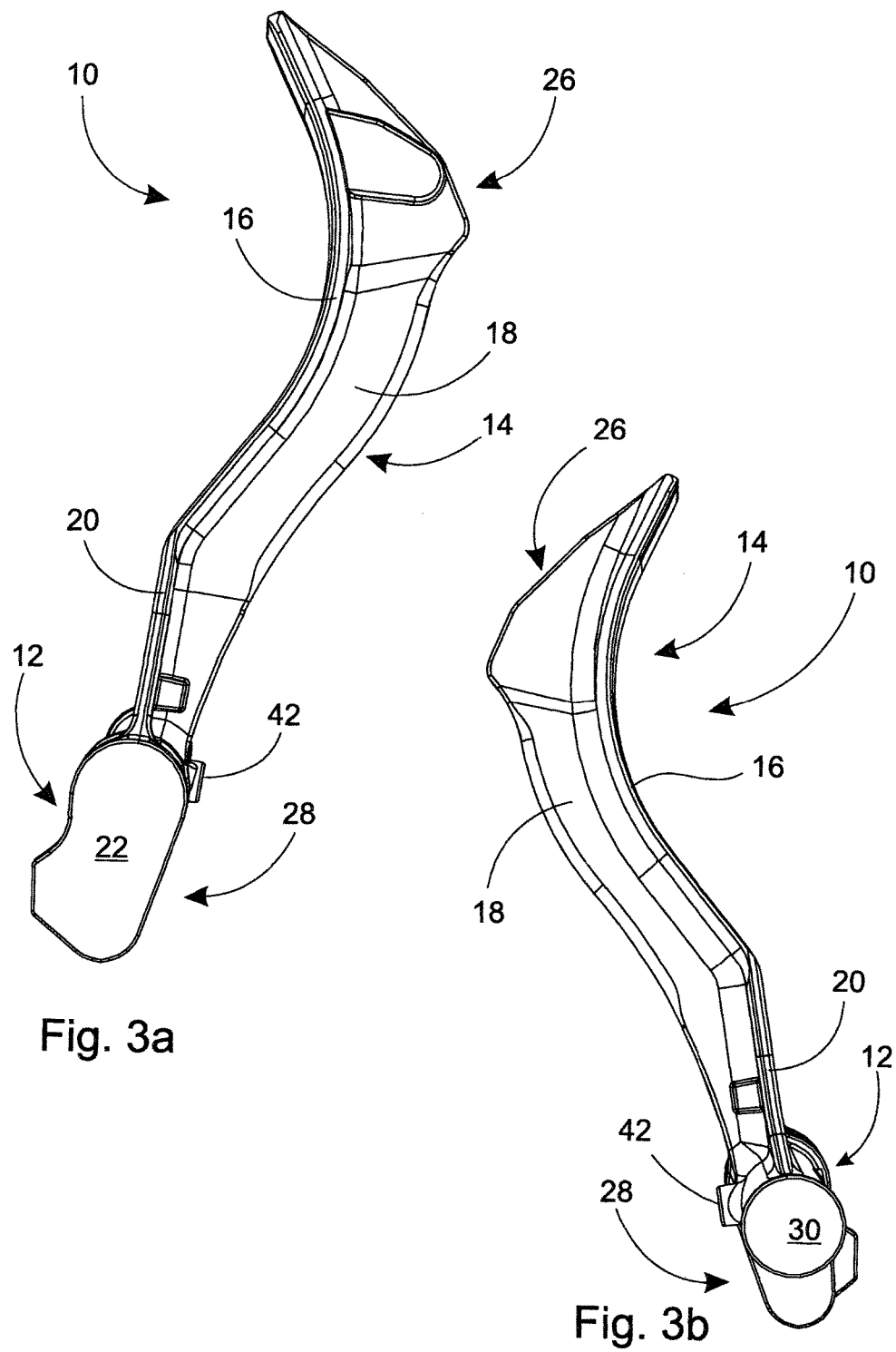

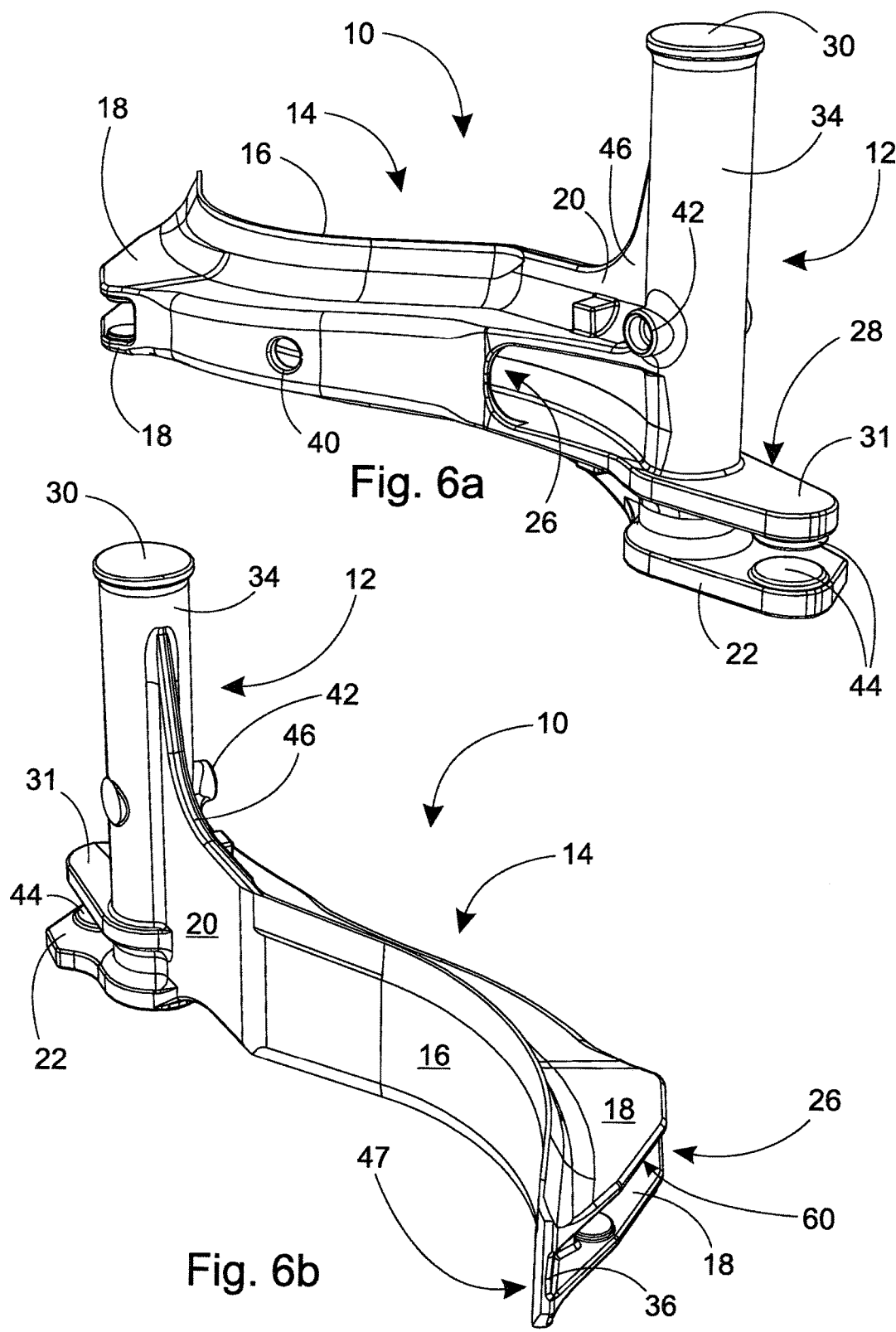

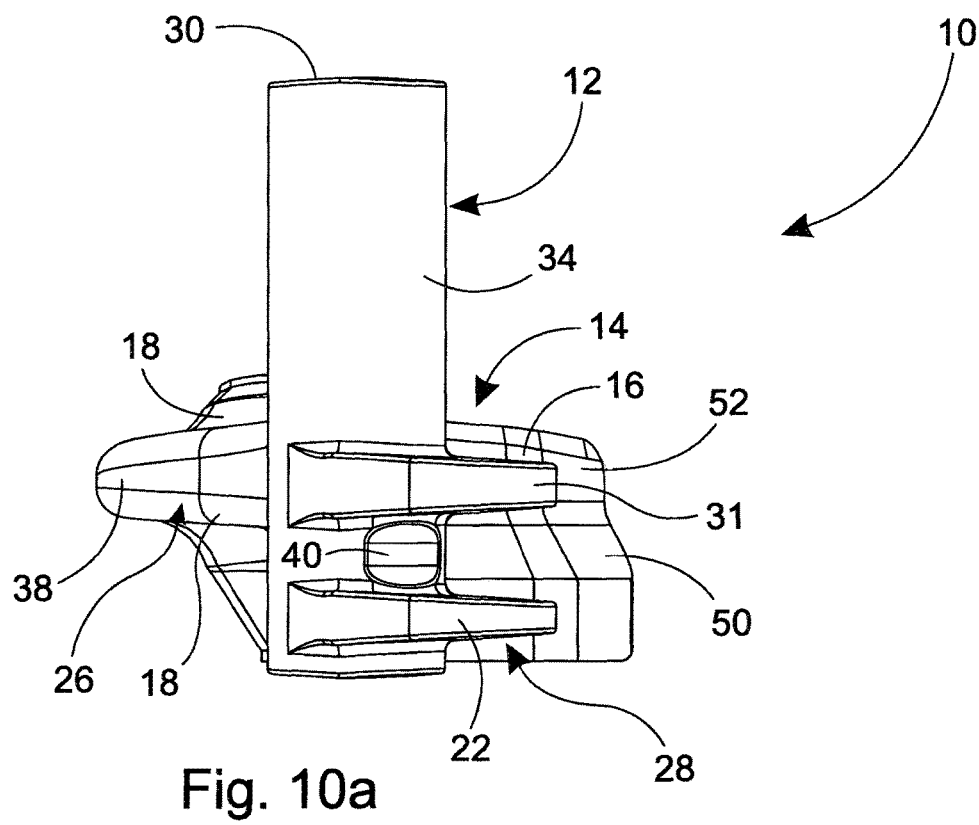
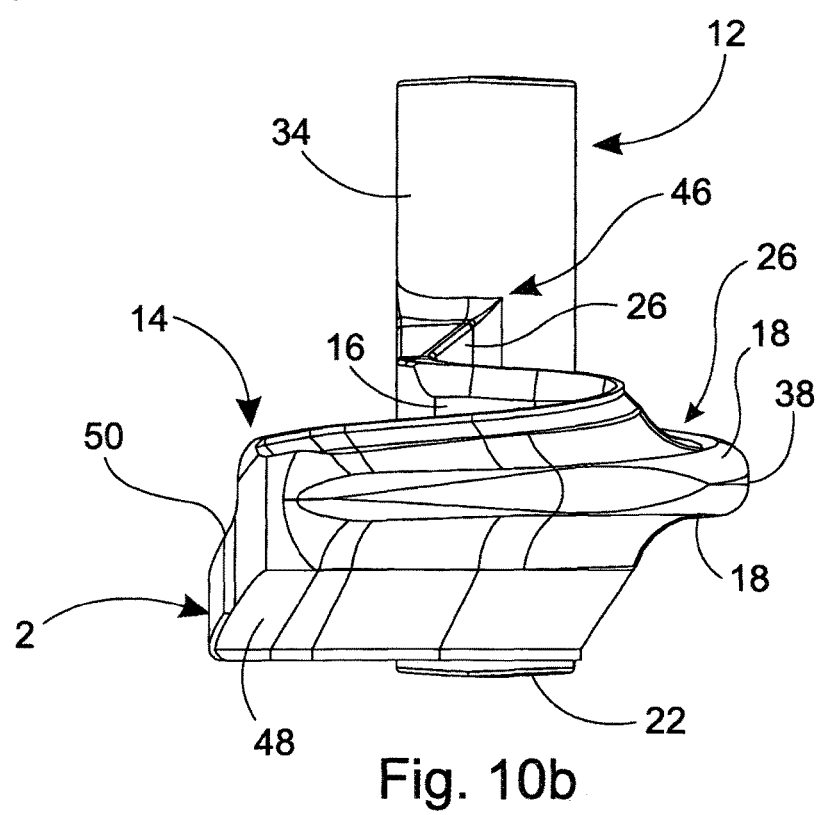

STRIPPING BLADE FOR A FORESTRY MACHINE

This application claims benefit of priority from International Patent Application No: PCT/FI2013/050686filed Jun. 20, 2013, which claims benefit of Finland Patent Application No. 20125737, both of which are incorporated by reference in their entirety.

FIELD OF THE INVENTION

The invention relates to a stripping blade for a forestry machine, which includes an attachment part for pivoting the stripping blade to the forestry machine, and an at least partly curved blade part attached to the attachment part for stripping the branches of a tree, which blade part includes a blade surface that at least partly conforms to the trunk of the tree and a support structure conforming to the blade surface connecting to the outer surface of the blade surface relative to the tree, which stripping blade is manufactured mainly by casting.

BACKGROUND OF THE INVENTION

Nowadays, the task of harvester heads used in forestry machines is to fell a tree, strip the branches from it, and cut the tree into suitable lengths. In addition, the harvester head can have other additional tasks. To strip the branches from a tree, the harvester head includes stripping blades, which press around the trunk of the tree. With the aid of a transfer device, the tree is moved in its longitudinal direction through the harvester head, so that the stripping blades strike the branches and strip them off the trunk. In the present application, the term forestry machine also refers to devices used as processors, which are on the ground or otherwise supported, and are used to process trees that have been already felled.

Freedom from maintenance is one of the most important properties in terms of the work efficiency of a harvester head. One factor affecting this property is the durability of the stripping blades. Publication U.S. Pat. No. 8,002,004 B2 discloses a solution according to the prior art, in which the stripping blades are manufactured by welding from steel with a high strength and hardness. However, welding weakens the fatigue resistance of the stripping blade and the hardness of the blade. In addition, the dimensional precision of a welded stripping blade is poor when the welded points warp and cause stresses in the stripping blade. In addition, the strong and hard manufacturing material interferes with the sharpening of the blade. In addition, the welded construction is expensive and slow to manufacture.

Further, a drawback in known solutions has been their weight, attempts having been made to reduce this as much as possible. At the same time, however, the durability of the structure, which suffers from the lightening of the materials, becomes a barrier. In addition, separate brackets must be made for the hoses of, for example, colour-marking or other accessories, which would otherwise be exposed to possible damage.

SUMARY OF THE INVENTION:

The invention is intended to create a stripping blade with better durability and ease of maintenance than stripping blades of the prior art. The stripping blade according to the present invention is characterized by a stripping blade for a forestry machine comprising an attachment part for pivoting the stripping blade to the forestry machine, and at least a partly curved blade part attached to the said attachment part for stripping the branches of a tree, the blade part comprising a blade surface at least partly conforming to the trunk of the tree and a support structure conforming to the blade surface connecting to the outer surface of the blade surface relative to the tree, which said stripping blade is manufactured mainly by casting, wherein the said support structure is hollow.

This intention is achieved by means of a stripping blade for a forestry machine, which includes an attachment part for pivoting the stripping blade to the forestry machine and an at least partly curved blade part, attached to the attachment part, for stripping the branches from a tree. The blade part includes a blade surface that at least partly conforms to the tree's trunk and a support structure that conforms to the blade surface and connects to the outer surface of the blade surface relative to the tree. The stripping blade is made mainly by casting and the support structure is hollow. The use of casting in manufacture can avoid the use of welded seams, thus achieving better fatigue resistance and blade hardness than would be the case in a material softened by a welding seam. This results in considerably better wear resistance than in welded structures. By means of a hollow cast structure, the stripping blade can be more highly optimized, allowing it to be implemented in a lighter form than in solutions according to the prior art, while nevertheless achieving greater strength and fatigue resistance than a welded structure. In other words, by means of a hollow cast stripping blade, the best aspects of cast and welded constructions are combined.

Casting is preferably performed as mould casting, utilizing at least one core. In other words, casting is performed utilizing a casting mould. The use of a single casting mould facilitates the support of the core.

The hollow support structure is preferably arranged to act as a flow channel for a liquid/gas, or to contain channels acting as flow channels for a liquid/gas, in order to transfer a liquid/gas. Thus, for example, separate channels, i.e. for example pipes or hoses, can be protected inside the structure.

The blade part preferably includes at least one hole, extending to the central area of the hollow space, for the support of the core. With the aid of the hole, the support structure can be lightened and the installation of channels in the support structure can be facilitated.

According to one embodiment, the holes in the blade part are on the tree side of the blade part. The height of the support structure can then be low.

According to a second embodiment, the holes in the blade part are on the opposite side of the blade part relative to the tree. The blade surface can then be made unbroken.

The blade part can include a sharpening part, to make the stripping blade easier to cast, in the area of which sharpening part the blade surface can be 2-10 mm, preferably 3-7 mm thick. The thickness of the point part will make the stripping blade easier to cast.

The sharpening part is preferably continuous over the entire length of the blade surface and is an area measuring 2-10 mm, preferably 3-7 mm in the tree's stripping direction.

In the blade part, there can be a mainly unified structure surrounding the hollow space, to improve the stripping blade's torsional stiffness. The improved torsional stiffness allows the structure of the stripping blade to be lighter than otherwise.

The hollow space can be arranged to be at least 15%, preferably 30-60% of the dimension of the blade part. In this way, the channels can be protected effectively over the entire length of the blade part.

The stripping blade is preferably cast to form a single unified metal piece. The stripping blade can thus be implemented without joints that would weaken the structure.

The stripping blade preferably includes a base of the blade part, which base includes an attachment point for pivoting the stripping blade to the operating device driving the stripping blade.

The transverse cross-sectional surface area of the hollow space in the blade part can be at least 100 mm², preferably at least 200 mm². The space will then be large enough for the core used in casting to be supported inside the support structure. The space will then also be large enough to accommodate possible hoses of colour-marking or other accessories.

The height of the support structure can be at least 25% of the height of the blade part, preferably at least 33% of the height of the blade part. A casting core can then be set inside the support structure and hoses or conductors can be placed inside the support structure.

According to one embodiment, the support structure is attached to the blade surface so as to be at a distance of at least 1.5 cm, preferably at least 2 cm from the upper and lower edges of the blade part. This will allow the stripping blade to be used to strip branches in both directions.

The support structure is preferably open longitudinally at both ends of the support structure. Thus the core can be supported firmly in place.

At least one hose for an accessory of the stripping blade is preferably fitted inside the hollow space of the support structure. This will protect the hose from impacts.

The attachment part of the stripping blade can include a sleeve-like structure and an attachment-support surface at its end to support the sleeve-like structure on the forestry machine, in which the diameter of the attachment-support surface can be greater than that of the sleeve-like structure. The attachment-support surface's area available for mounting bearings can thus be larger, the sleeve-like structure being nevertheless as narrow as possible.

Using a cast hollow stripping blade allows freer shaping of the blade than the use of welded structures, as the curvature of a cast structure can be as desired, without limitations relating to the minimum bending radius. A cast component will also be dimensionally accurate, nor will it warp like a welded structure. In addition, a cast stripping blade is considerably easier to sharpen than a welded structure, as a cast blade can be sharpened before heat treatment, when the material is softer. The manufacture of a cast stripping blade involves considerably fewer work stages than a welded stripping blade, which improves the cost effectiveness of manufacture.

In the following, the invention is described in detail with reference to the accompanying drawings showing some embodiments of the invention, in which

BRIEF DESCRIPTION OF THE DRAWINGS

FIG. 3a shows a bottom view of a stripping blade according to a first embodiment of the invention, FIG. 3b shows a top view of a stripping blade according to a first embodiment of the invention, FIG. 6a shows a rear axonometric view of a stripping blade according to a first embodiment of the invention, FIG. 6b shows a front axonometric view of a stripping blade according to a first embodiment of the invention, FIG. 10a shows a rear view of a stripping blade according to a second embodiment of the invention, FIG. 10b shows a front view of a stripping blade according to a second embodiment of the invention.

DETAILED DESCRIPTION OF THE INVENTION

Figure 1:
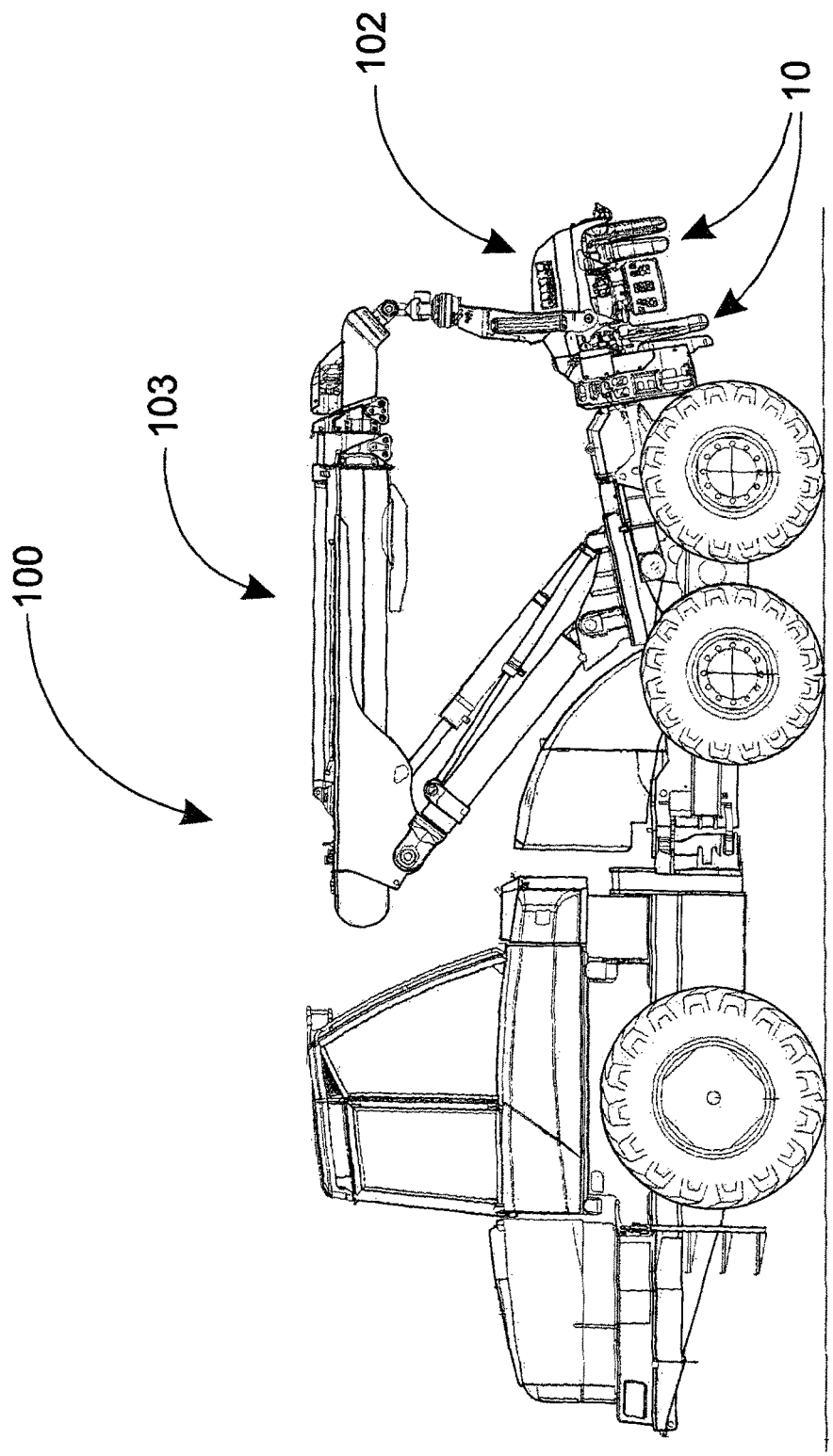
FIG. 1 shows a stripping blade according to the invention attached to the harvester of a forestry machine.
Figure 2:
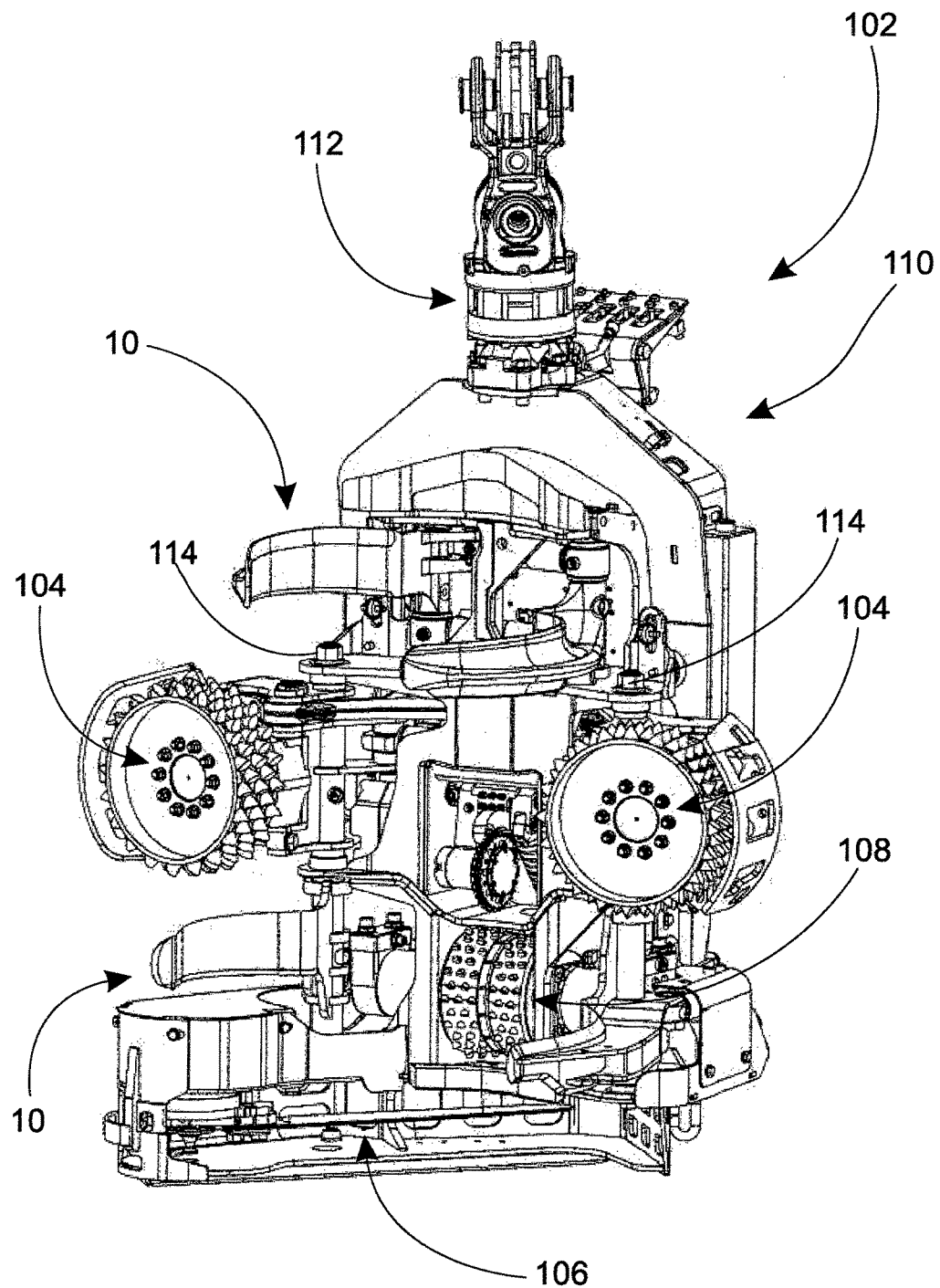
FIG. 2 shows a stripping blade according to the invention in a harvester.

In this connection, when reference is made to viewing in the direction from above downwards, this means the direction parallel to the attachment shaft of the stripping blade towards the base of the stripping blade. Viewing from the front of the stripping blade refers to the direction from the centre point of the tree perpendicularly towards the blade surface of the stripping blade. According to FIG. 1, the invention relates to a stripping blade 10 of a harvester 102 attached to a forestry machine 100. According to FIG. 2, the harvester generally includes, in addition to stripping blades 10, a body 110, tree-transfer operating devices 104 and 108, i.e. in this case grabs equipped with transfer rollers and a separate transfer roller, a rotator 112, and a cutting device 106. The primary purpose of the stripping blades 10 is to strip trees and secondarily to act as an aid for the transfer devices 104 in holding a tree in the throat of the harvester 102. In a harvester, there are generally two pairs of stripping blades 10, so that the tree can be stripped on all sides. The stripping blades 10 are curved according to the curvature of the tree. The stripping of a tree takes place by moving the tree with the aid of the transfer operating devices 104 and 108 essentially parallel to the direction of the stripping blades' attachment shafts 114, when the sharpened edges of the blade surface of the stripping blades 10 cut off the tree's branches. In some cases, a stripping blade according to the invention can also be used to de-bark a tree, for example a *eucalyptus*.

According to FIGS. 3a and 3b, the stripping blade according to the invention includes an attachment part 12, a blade part 14, and an attachment point 44. The attachment part 12 is preferably a sleeve-like structure 34, with the aid of which the stripping blade 10 is attached around an attachment shaft 114 (in FIG. 2). In the upper part of the attachment part 12 there can be a thickening, i.e. an attachment support surface 30, with the aid of which the stripping blade 10 is supported on the harvester. The attachment support surface 30 preferably has a diameter greater than that of the sleeve-like structure 34, thus giving a greater axial surface in the attachment support surface 30 for mounting bearings. The sleeve-like structure 34 too can thus be made as thin as its durability permits. An at least partly curved blade part 14, with the aid of which the stripping of the branches of the tree takes place, is, for its part, attached to the attachment part 12. The blade part 14 includes a blade surface 16 that essentially conforms at least partly to the tree's trunk and a support structure 26 that conforms to the shape of the blade surface 16 and is attached at right angles to the blade surface 16. The support structure 26 is located on the opposite side of the blade surface 16 of the stripping blade 10 relative to the tree. In this case, the attachment point 44 is located on the base 28, which is located on the opposite side of the attachment part 12 relative to the blade part 14. With the aid of the attachment point 44, the operating device driving the stripping blade 10 can be attached to the stripping blade 10 in order to move it.

The blade surface 16 is given a curved shape to conform to the shape of the tree. The blade part 14 also includes a butt 20, which joins the blade surface to the attachment part 12. The support structure 26 is preferably continuous over the entire length of the blade part, or at least over more than 15% of it. In the stripping blade of the first embodiment according to FIGS. 3a and 3b, the support structure 26 is formed of two support surfaces 18. The stripping blade according to the invention is preferably cast to form a single individual piece. This permits the stripping blade to be made entirely or at least mostly without welding seams, thus improving the blade's structure. According to one embodiment, the hollow space can also consist of several separate portions, in which case the hollow space will not be unified and continuous over the entire length of the stripping blade.

Figure 4A:
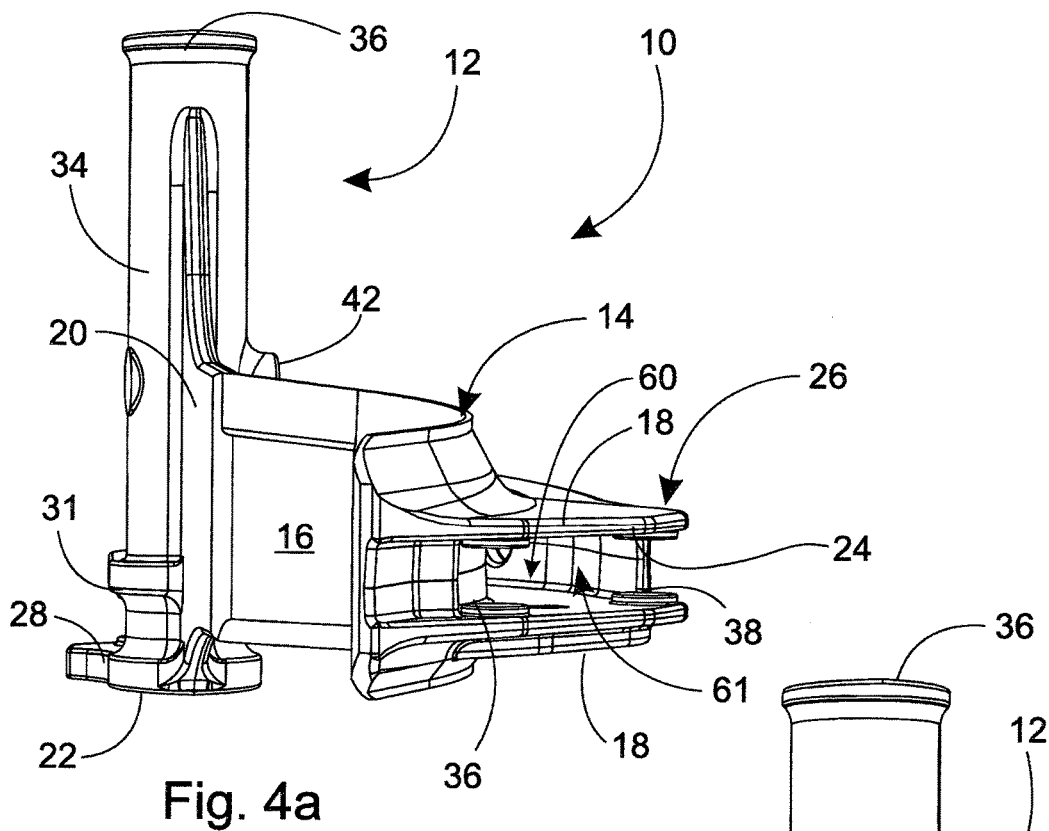
FIG. 4a shows a stripping blade according to a first embodiment of the invention, viewed longitudinally towards the point part of the stripping blade.
Figure 4B:
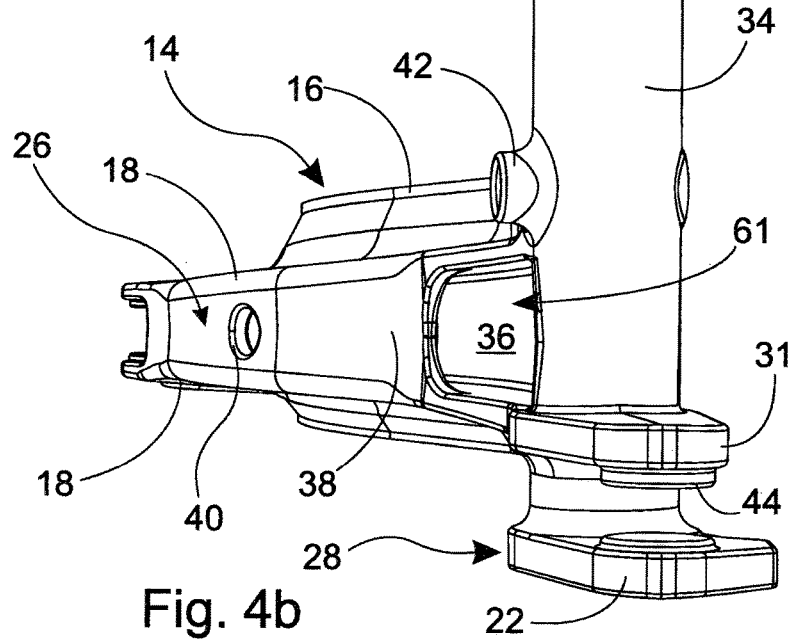
FIG. 4b shows a stripping blade according to a first embodiment of the invention, viewed longitudinally towards the base part of the stripping blade.

FIG. 4a shows a stripping blade 10 according to a first embodiment seen from the end of the blade part 14 towards the attachment part 12. According to the figure, the support structure 26 is formed of two essentially parallel support surfaces 18, which are attached to each other with the aid of an outer surface 38 and an inner surface 36. An empty space remains between these aforementioned parts, i.e. the stripping blade 10 is hollow. In other words, the hollow space 60 is surrounded by a mainly unified structure, which improves the torsional stiffness of the stripping blade. The hollow construction lightens the total weight of the stripping blade 10 and permits the transfer of various liquids/gases, for example for channels (not shown) used for feeding colour marking, and/or urea, for spreading timber preservative, or a stump treatment agent through the hollow space right to the point part of the stripping blade. The hollow space 60 can also be used to feed a hydraulic hose through. The strength of the hollow structure corresponds to that of a solid structure, as practically no forces act on the centre part of a solid support structure. According to FIGS. 4a and 4b, the hollow space 60 is preferably open at both ends 61, so that colour-marking and/or urea-feed channels can be easily led into the support structure 26. In addition, the open ends act as openings for the support of the core in the casting mould.

Figure 5A:
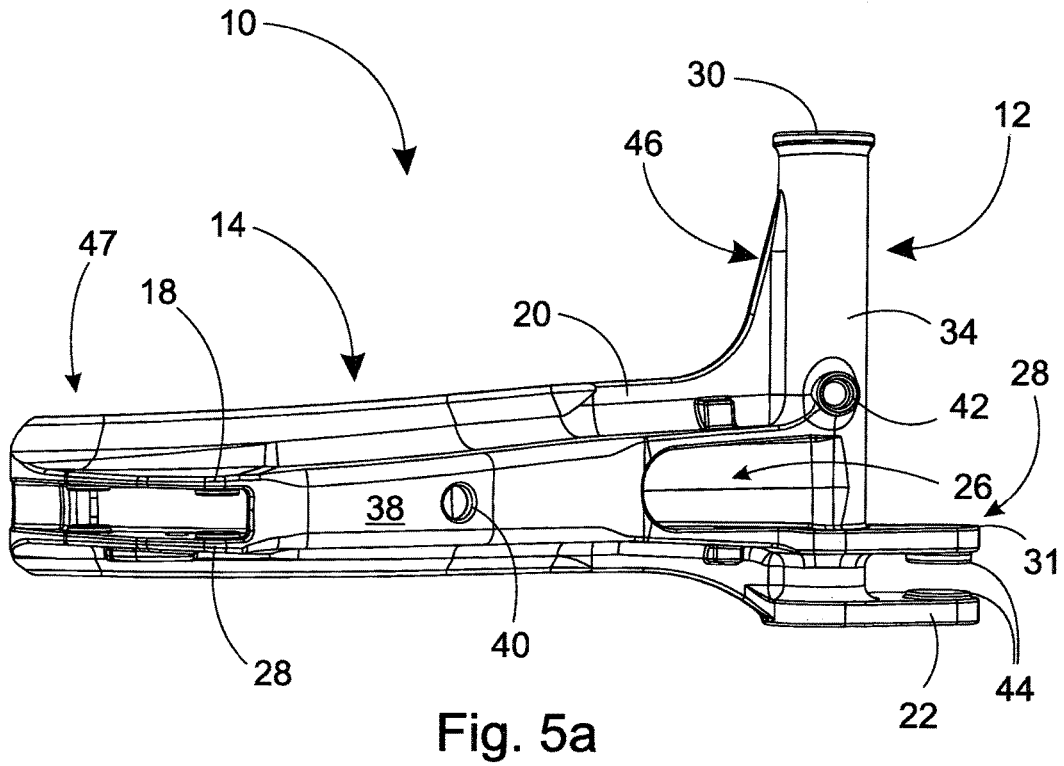
FIG. 5a shows a rear view of a stripping blade according to a first embodiment of the invention.
Figure 5B:
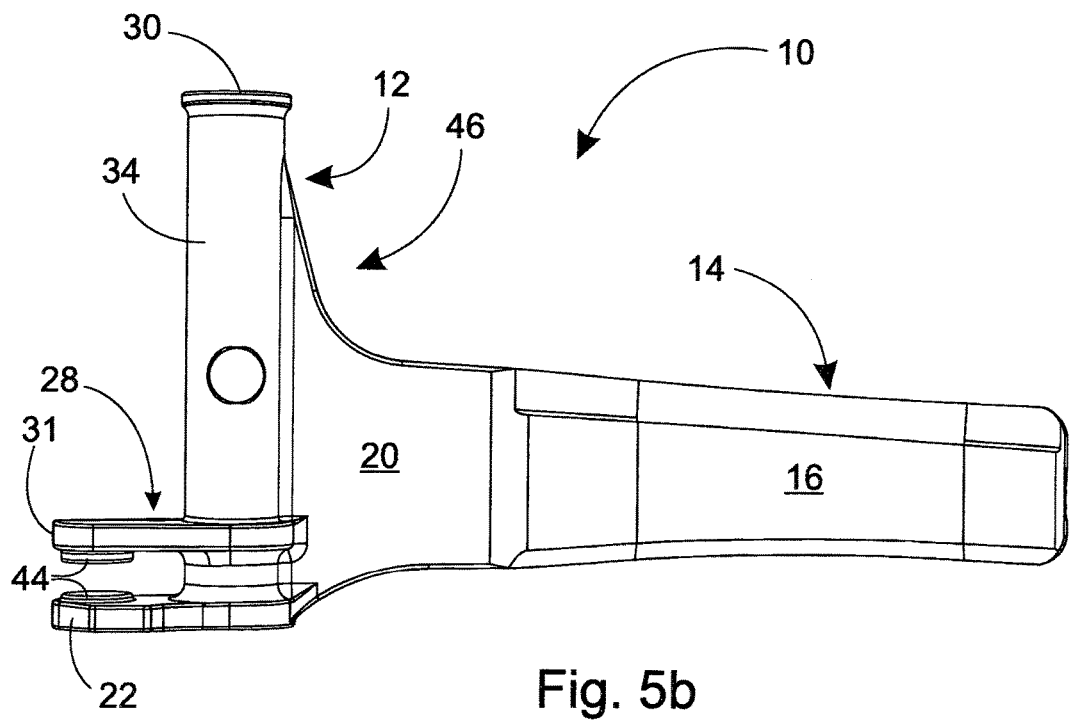
FIG. 5b shows a front view of a stripping blade according to a first embodiment of the invention.

According to FIGS. 5a and 5b, the butt 20 of the blade part 14 widens from the height of the blade surface 16 to nearly the height of the attachment part 12 as it nears the widening portion 46 of the attachment part 12. Thus the attachment surface between the butt 20 and the attachment part 12 is as wide and sturdy as possible. In this case, the base 28 is attached to the lower surface of the attachment part 12. The base 28 is formed of two base parts 22 and 31, between which the operating device driving the stripping blade 10 is pivoted.

The stripping blade also includes holes 40 for supporting the core in the casting stage and for lightening the stripping blade. In addition, the holes can be utilized, for example, for installing channels, i.e. for example hoses/pipes, in the hollow space 60. In the casting stage of the stripping blade, the mould includes two halves, in the first of which is the mould and core and in the second the other half of the mould. The core is supported during casting with the aid of sand plugs through holes to the interior of the hollow pieces, the core made of sand being vibrated out from inside the hollow pieces once the cast stripping blade has hardened. The holes do not weaken the structure of the stripping blade as they are located at points at which large stresses do not naturally occur. In this embodiment, the holes 40 can be made in the blade part 14 in the surface opposite to the surface coming against the tree. The actual blade surface can thus be unbroken and unified. The hollow space 60 of the support structure 26 is preferably continuous. There is preferably at least one hole 40 in the blade part. In the figures, the reference number 42 refers to a housing for a grease nipple. The holes can be made in the stripping blade from any direction at all, even parallel to the longitudinal axis of the stripping blade, as long as they extend into the hollow space.

According to FIGS. 6a and 6b, the blade surface 16 of the stripping blade 10 can be sharpened at both the upper and lower edges and the tree can be moved by the harvester in either direction relative to the stripping blades, in order to perform stripping. In terms of the sharpening of the stripping blades, the cast structure is excellent, as the sharpening shape in the cast stripping blade comes nearly ready during casting. The sharpening of a cast blade requires considerably less work to finish than the machining of all the sharpening of a welded blade as in solutions according to the prior art. In addition, the dimensionally precise casting makes it unnecessary to machine the blade part coming against the tree.

Figure 7:
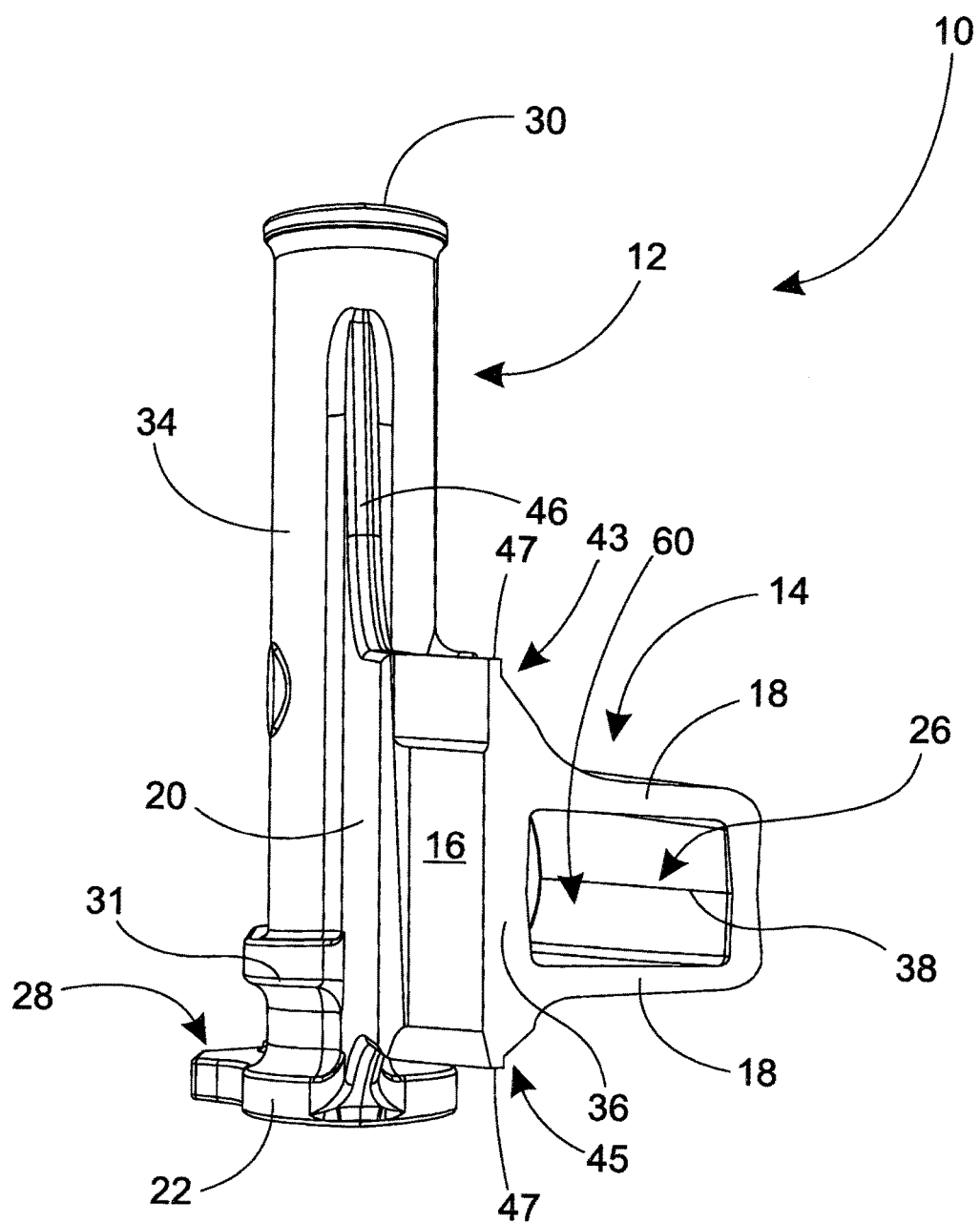
FIG. 7 shows a cross-section of a stripping blade according to a first embodiment of the invention.
Figures 8A, 8B:
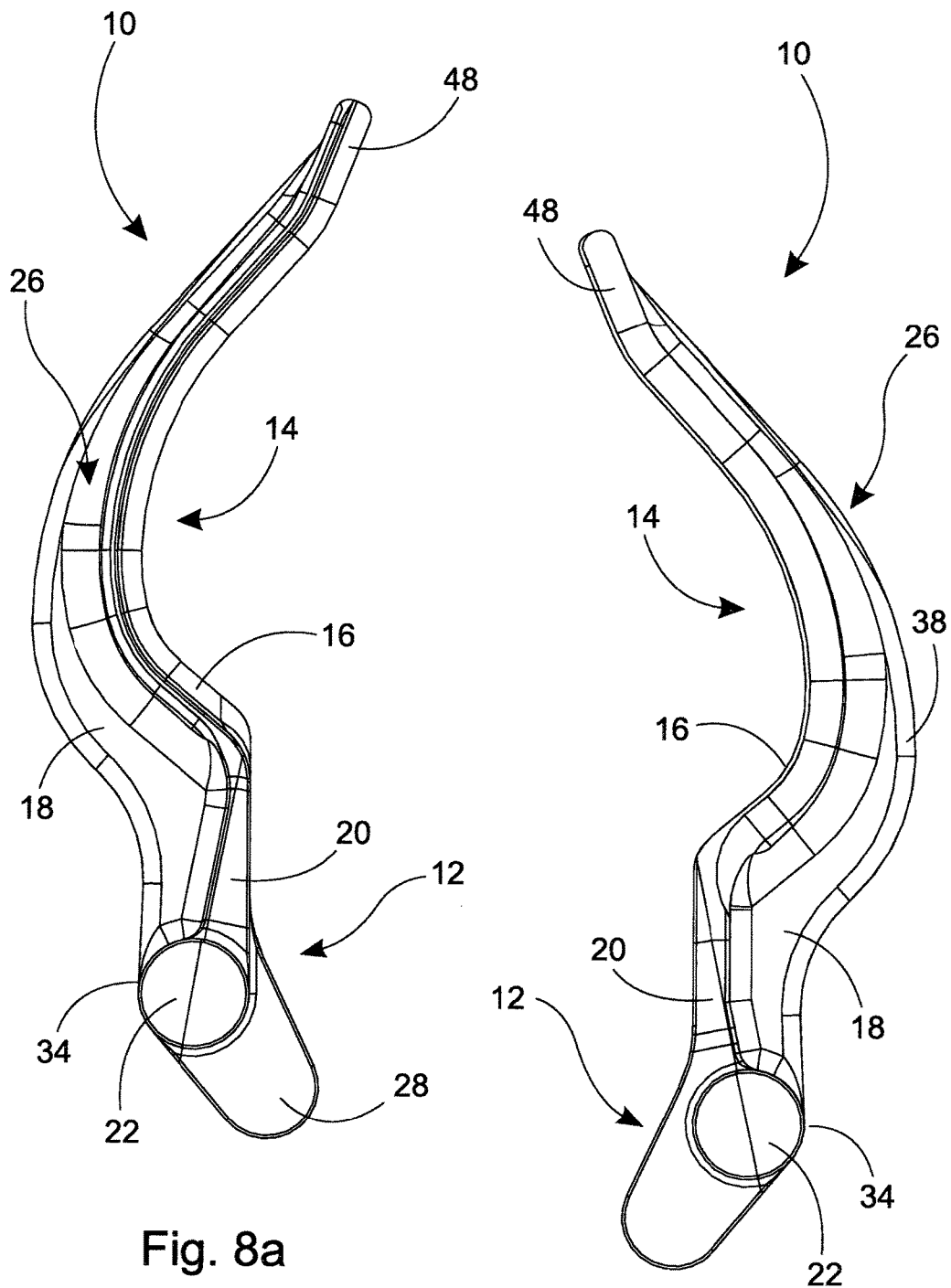
FIG. 8a shows a bottom view of a stripping blade according to a second embodiment of the invention.
FIG. 8b shows a top view of a stripping blade according to a second embodiment of the invention.

FIG. 7 shows a cross-section of the construction of the stripping blade. The figure shows how the blade surface 16 is advantageously sharpened above and below. In the case of the hollow support structure 26, the wall thickness of the stripping blade 10 is essentially the same in the outer surface 38 and in the support surfaces 18. The inner surface 36 is advantageously formed by the blade surface 16. The cross-section of the hollow space can have any shape whatever suitable to the purpose.

FIGS. 8a-12 show a stripping blade 10 according to a second embodiment of the invention. The second stripping blade 10 too is formed of the same basic components as the first embodiment, i.e. an attachment part 12, a blade part 14, a support structure 26 for the blade part 14, and an attachment point 44. Structurally, the technical difference between these two embodiments is in the support structure 26 of the blade part 14, which in the second embodiment too is hollow, but which is not intended for running colour-marking and/or urea-spreading hoses through it. Thus the hollow space inside the support structure 26 is considerably smaller than in the first embodiment shown in FIGS. 3a-7.

Figure 9A:
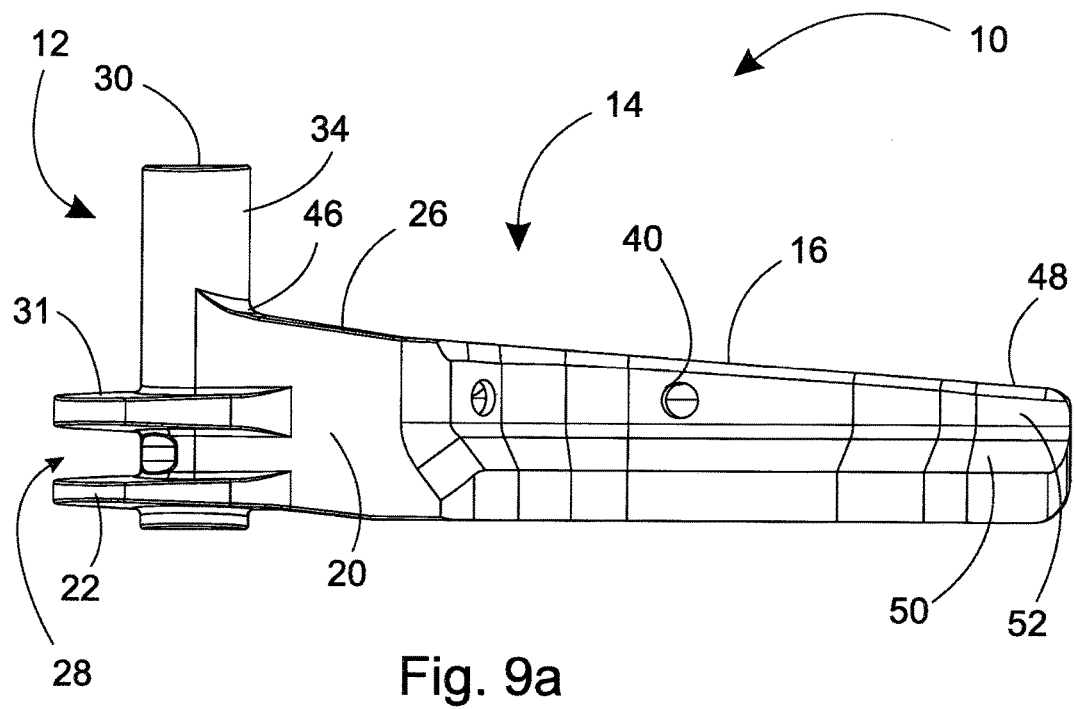
FIG. 9a shows a stripping blade according to a second embodiment of the invention viewed longitudinally towards the point part of the stripping blade.
Figure 9B:
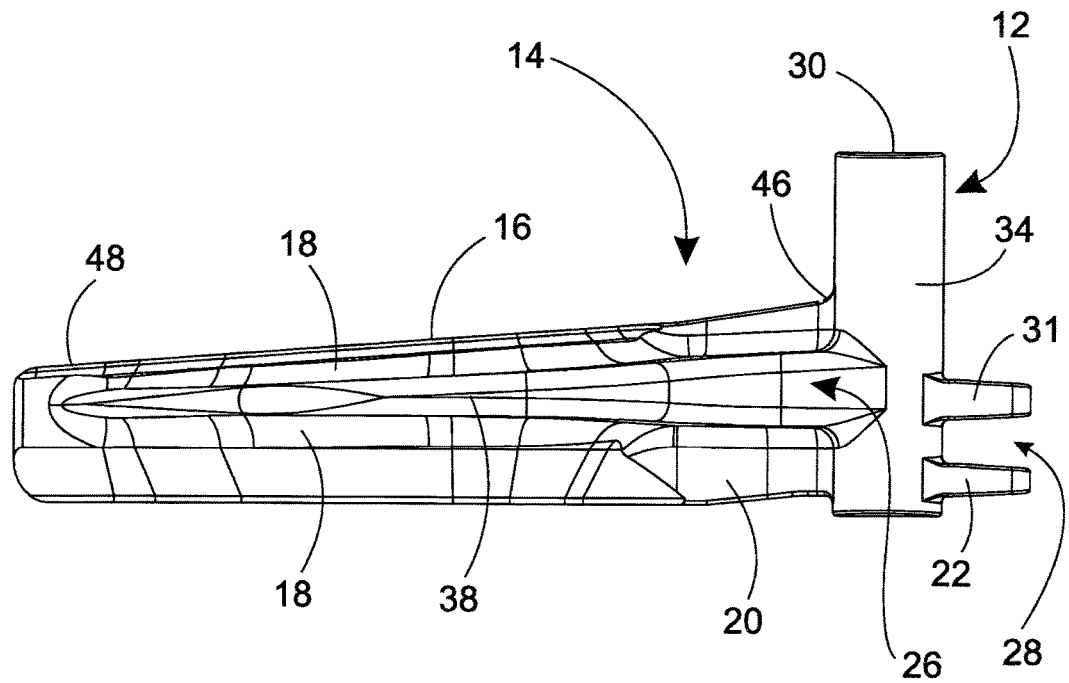
FIG. 9b shows a stripping blade according to a second embodiment of the invention viewed longitudinally towards the base of the stripping blade.

According to FIG. 9a, in this embodiment the holes 40 are preferably made in the blade surface 16, i.e. in the surface of the blade part 14 that comes against the tree. The holes can also be manufactured in any direction whatever, as long as they extend into the hollow space. In this embodiment, there are preferably two holes in the blade part. The blade surface 16 can be formed to curve in two directions, i.e. the blade surface 16 is curved both according to the shape of the tree surface from the point to the butt 20 and in the height direction of the blade surface 16 from the bottom upwards. The blade surface 16 will then consist of an essentially parallel upper surface 52 and a lower surface 48, as well as of an intermediate surface 50 at an angle between them.

According to FIGS. 9b-10b, the support structure 26 of the blade part 14 is considerably lower in height than the support structure of the first embodiment. As in this embodiment the support structure 26 is not used to feed channels through, its only task is to stiffen the blade part 14. For this purpose, the support structure 26 can be relatively low, 10-35%, preferably 15-25% of the height of the blade surface 16. Also in this connection, the support structure 26 is hollow, thus reducing the total weight of the stripping blade 10. According to FIG. 10a, in this embodiment too the hollow space of the support structure 26 is open at least one end, to support the core.

Figure 11A:
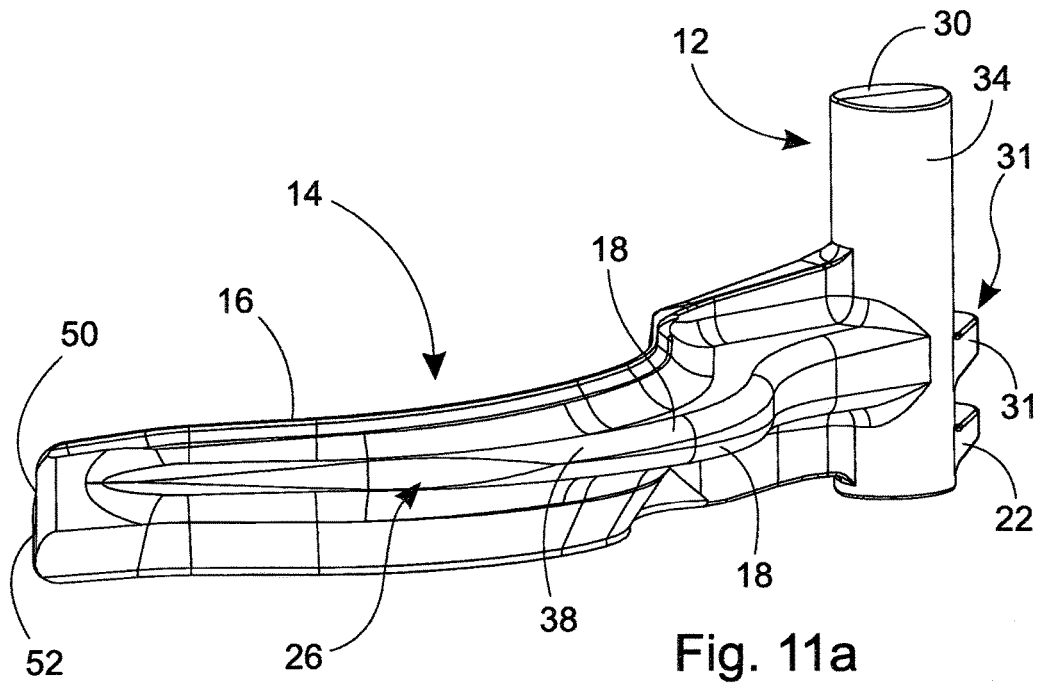
FIG. 11a shows a rear axonometric view of a stripping blade according to a second embodiment of the invention.
Figure 11B:
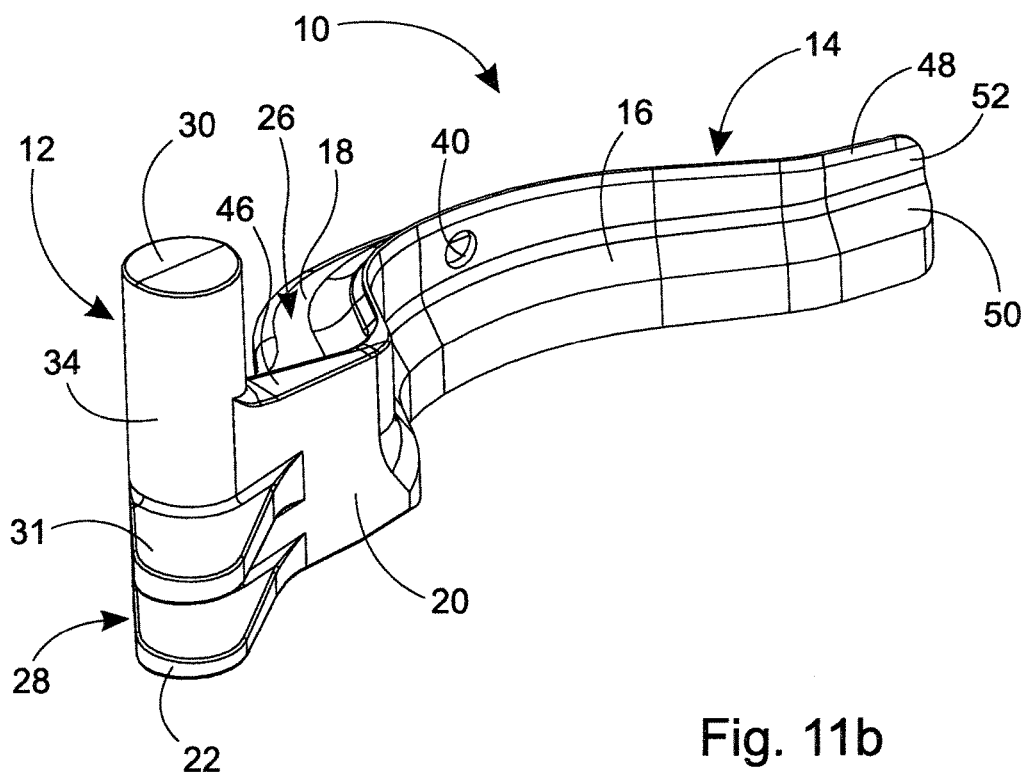
FIG. 11b shows a front axonometric view of a stripping blade according to a second embodiment of the invention.
Figure 12:
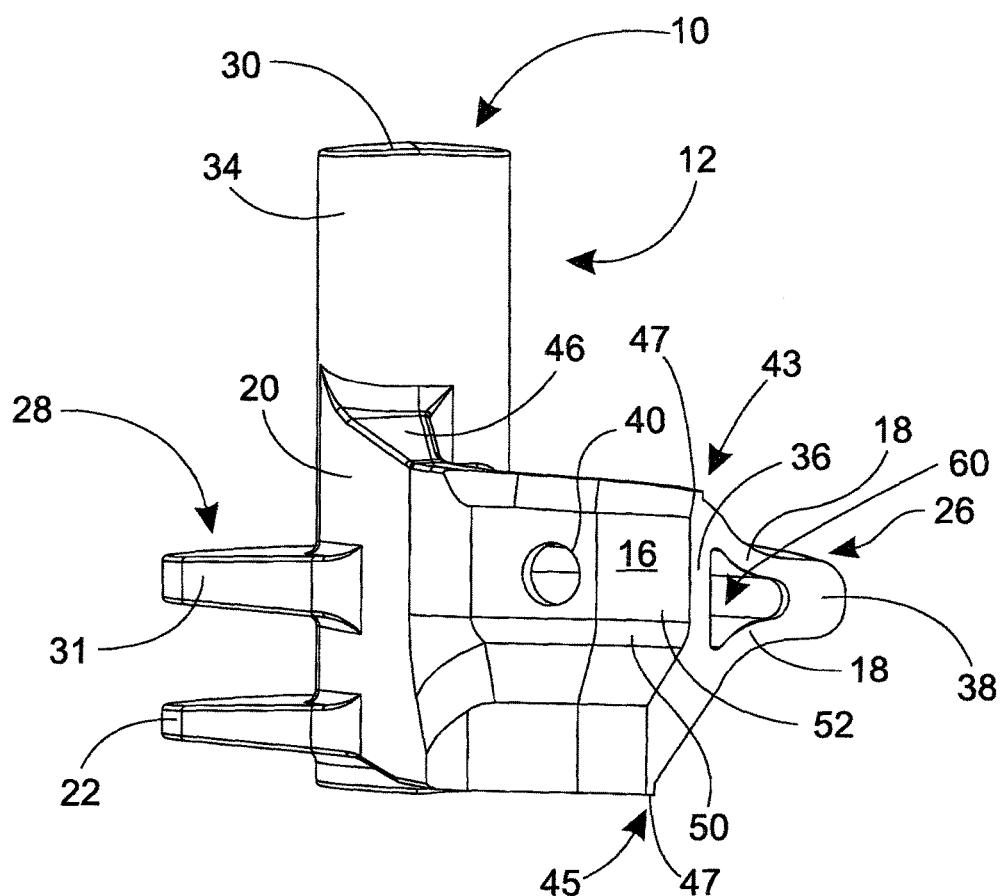
FIG. 12 shows a cross-section of a stripping blade according to a second embodiment of the invention.

According to FIGS. 11a and 11b, in the stripping blade 10 of the second embodiment the butt 20 of the blade part 14 can be lower than that in the stripping blade of the first embodiment. For its part, the cross-section of FIG. 12 shows that in the second embodiment too the support structure 26 is formed of support surfaces 18, as well as the outer surface 38 and the inner surface 36 formed by the blade surface 16. In this embodiment too, both the upper and lower surfaces of the blade surface can be sharpened for stripping, so that the direction, of stripping a tree is of no significance in terms of the final result.

In the stripping blade 10 according to the invention, when viewed from the upper edge 43 and/or the lower edge 45 of the blade part in a direction perpendicular to the longitudinal direction of the blade part 14, there can be a sharpening portion 47, shown in FIGS. 7 and 12. The sharpening portion is intended to facilitate manufacture, as sharp corners cannot be made by casting. Thus, a 2-10 mm thick, preferably 3-7 mm thick sharpening portion, in the area of which the blade surface 16 is sharpened to a sharp point, is cast into the blade part. During sharpening, the thicker portion is ground off, so that the sharpened stripping blade does not have a thicker portion. There can be a sharpening portion in both the upper edge and the lower edge, or only in one edge. The sharpening portion is preferably continuous over the entire length of the blade part.

Overall, the structure of the stripping blade according to the invention is lighter than the welded structures according to the prior art, which is reflected in the total weight of the forestry machine. According to FIG. 1, in the forestry machine 100 work booms 103 are used, at the end of which the harvester 102 is suspended. If the harvester is being used to work, for example, at a distance of 10-11 m to the side of the forestry machine, an additional kilogram added to the harvester will affect the weight of the whole forestry machine many times over. The work boom must then be stronger and the chassis of the forestry machine will in turn have to carry larger loads. To make the forestry machine stable while working, the tracks must be widened and additional weights added to the tyres, so that the forestry machine will remaining standing. In addition, a heavier forestry machine will leave deeper ruts in soft ground. For example, if each stripping blade of the harvester weighs one kilogram more, the weight of the harvester will increase by four kilograms. About 25 kg of additional weight will then be required in the centre of the forestry machine, if the harvester is 11 metres from the forestry machine and the forestry machine is tilted around the outer edge of a tyre 1.5 m from the centre point of the forestry machine.

The cross-sectional surface area of the hollow space formed inside the support structure during casting is at least 100 mm$^2$, preferably at least 200 mm$^2$. The hollow space will then be large enough for the core used in casting to be able to be supported inside the support structure. Further, the hollow space will then be large enough for possible hoses for colour-marking or other accessories. For example, for colour marking, two hoses with a diameter of about 10-20 mm can be advantageously installed in the hollow space.

The height of the support structure can be at least 25% of the height of the blade part, preferably at least 33% of the height of the blade part. It will then be possible to place a core inside the support structure for casting and it will be possible to place hoses or conductors inside the support structure. In the longitudinal direction of the tree, the blade part of the stripping blade has a height typically 8-15 cm high and the support structure in turn 4-8 cm high. Generally, the distance between the support structure and the blade structure as the first component to meet a tree branch is at least 2 cm, so that the blade surface will cut the branch before the branch strikes the support structure of the blade part in the direction of travel.

The material of the stripping blade according to the invention can be a metal or metal alloy suitable for the purpose, by which sufficient stiffness and durability can be achieved, but which nevertheless can be sharpened. According to one embodiment, in processor operation a detachable extension piece can be attached to the end of the stripping blade.

According to one embodiment, the hollow space of the support structure can also be used as a flow channel for liquid, through which the liquid flows towards the point part of the blade part. In that case the support structure itself will act as the walls of the flow channel In this embodiment, the holes belonging to the blade part are plugged.

The invention claimed is:

1. A stripping blade for a forestry machine, comprising:
   an attachment part attached at an end to the forestry machine; and
   an at least partly curved blade part attached to the attachment part to allow for pivoting of the blade part, the blade part for stripping the branches of a tree, the blade part comprising:
   a blade surface having an outer surface, the blade surface conforming at least partly to the trunk of the tree, and
   a support structure conforming to the blade surface and connecting to the outer surface of the blade surface relative to the tree, the support structure being a hollow cast structure having a hollow space and a structure surrounding the hollow space inside the structure.

2. The stripping blade according to claim 1, where the hollow space is arranged to act as a flow channel for at least one of a liquid or a gas, or to contain channels acting as flow channels for at least one of a liquid or a gas, in order to transfer the at least one of a liquid or a gas.

3. The stripping blade according to claim 1, where the blade part comprises at least one hole extending into a centre area of the hollow cast structure.

4. The stripping blade according to claim 1, where either an upper edge of the blade part, a lower edge of the blade part, or both, comprises a sharpening portion to facilitate casting the stripping blade, where the blade surface has a thickness of 2-10 mm in an area of the sharpening portion.

5. The stripping blade according to claim 1, where an upper edge of the blade part, a lower edge of the blade part, or both, comprises a sharpening portion to facilitate casting the stripping blade, where the blade surface has a thickness of 3-7 mm in the area of the sharpening portion.

6. The stripping blade according to claim 5, wherein the sharpening portion is continuous over the entire length of the blade surface and is an area measuring 2-10 mm in a stripping direction of the tree.

7. The stripping blade according to claim 6, where the sharpening portion is continuous over the entire length of the blade surface and is an area measuring 3-7 mm in the stripping direction of the tree.

8. The stripping blade according to claim 1, where the hollow space has a length at least about 15% of the length of the blade part.

9. The stripping blade according to claim 1, where the hollow space has a length between about 30 - 60% of the length of the blade part.

10. The stripping blade according to claim 1, where the support structure is a single unified metal piece.

11. The stripping blade according to claim 1, where the attachment part includes a sleeve structure and an attachment support surface at the stripping blade's end for supporting the sleeve structure on the forestry machine, where a diameter of the attachment support surface is greater than a diameter of the sleeve structure.

12. The stripping blade according to claim 1, where a transverse cross-sectional surface area of the hollow space in the blade part is at least 100 mm$^2$.

13. The stripping blade according to claim 1, where a transverse cross-sectional surface area of the hollow space in the blade part is at least 200 mm$^2$.

14. The stripping blade according to claim 1, where a height of the support structure is at least 25% of a height of the blade part.

15. The stripping blade according to claim 1, where a height of the support structure is at least 33% of a height of the blade part.

16. The stripping blade according to claim 1, where the support structure is attached to the blade surface in such a way that it is at a distance of at least 1.5 cm from the upper edge and the lower edge of the blade part.

17. The stripping blade according to claim 1, where the support structure is attached to the blade surface in such a way that it is at a distance of at least 2 cm from the upper edge and the lower edge of the blade part.

18. The stripping blade according to claim 1, where the support structure is open longitudinally at both ends of the support structure.

* * * * *